(12) United States Patent
Xu et al.

(10) Patent No.: US 9,020,287 B2
(45) Date of Patent: *Apr. 28, 2015

(54) METHODS AND APPARATUS FOR FILTER PARAMETER DETERMINATION AND SELECTION RESPONSIVE TO VARIABLE TRANSFORMS IN SPARSITY-BASED DE-ARTIFACT FILTERING

(75) Inventors: Qian Xu, Plainsboro, NJ (US); Yunfei Zheng, Plainsboro, NJ (US); Joel Sole, Princeton, NJ (US); Peng Yin, Ithaca, NY (US); Xiaoan Lu, Princeton, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 19 days.

This patent is subject to a terminal disclaimer.

(21) Appl. No.: 13/138,860

(22) PCT Filed: Mar. 26, 2010

(86) PCT No.: PCT/US2010/000915
§ 371 (c)(1),
(2), (4) Date: Oct. 11, 2011

(87) PCT Pub. No.: WO2010/120338
PCT Pub. Date: Oct. 21, 2010

(65) Prior Publication Data
US 2012/0030219 A1 Feb. 2, 2012

Related U.S. Application Data

(60) Provisional application No. 61/168,990, filed on Apr. 14, 2009.

(51) Int. Cl.
*G06K 9/36* (2006.01)
*H04N 19/82* (2014.01)
(Continued)

(52) U.S. Cl.
CPC ............. *H04N 19/82* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS

2005/0053294 A1* 3/2005 Mukerjee et al. ............. 382/236
2006/0093227 A1   5/2006 Bourge et al.
(Continued)

FOREIGN PATENT DOCUMENTS

JP    07-143483 A   6/1995
JP    2009-49779 A  3/2009
(Continued)

OTHER PUBLICATIONS

Guleryuz, "A Nonlinear Loop Filter for Quantization Noise Removal in Hybrid Video Compression", Image Processing, 2005. ICIP 2005, vol. 2, Sep. 11, 2005, pp. 333-336, XP010851057.
(Continued)

*Primary Examiner* — Jingge Wu
(74) *Attorney, Agent, or Firm* — Robert D. Shedd; Ronald J. Kolczynski

(57) ABSTRACT

There are provided method and apparatus for filter parameter determination and selection responsive to variable transforms in sparsity-based de-artifact filtering. An apparatus includes an encoder for encoding picture data for at least a portion of a picture. The encoder includes a sparsity-based de-artifact filter for performing sparsity-based de-artifact filtering on the portion. One or more filter parameters for the sparsity-based de-artifact filtering are determined and selected responsive to variable transforms.

23 Claims, 11 Drawing Sheets

(51) Int. Cl.

| | | |
|---|---|---|
| *H04N 19/159* | (2014.01) | |
| *H04N 19/176* | (2014.01) | |
| *H04N 19/172* | (2014.01) | |
| *H04N 19/46* | (2014.01) | |
| *H04N 19/61* | (2014.01) | |
| *H04N 19/117* | (2014.01) | |
| *H04N 19/174* | (2014.01) | |

(52) U.S. Cl.
CPC ............ *H04N 19/172* (2014.11); *H04N 19/46* (2014.11); *H04N 19/61* (2014.11); *H04N 19/117* (2014.11); *H04N 19/174* (2014.11)

(56) References Cited

U.S. PATENT DOCUMENTS

| | | | |
|---|---|---|---|
| 2006/0250653 A1* | 11/2006 | Joch et al. ..................... 358/3.26 | |
| 2008/0037897 A1* | 2/2008 | Chiang et al. ................. 382/273 | |
| 2009/0010333 A1 | 1/2009 | Tourapis et al. | |
| 2009/0285285 A1 | 11/2009 | Fujisawa et al. | |
| 2010/0128803 A1* | 5/2010 | Divorra Escoda et al. ....................... 375/240.29 | |
| 2010/0208827 A1* | 8/2010 | Divorra Escoda et al. ....................... 375/240.24 | |
| 2010/0245672 A1* | 9/2010 | Erdler et al. ................... 348/608 | |
| 2011/0211122 A1* | 9/2011 | Sullivan ......................... 348/581 | |
| 2011/0222597 A1* | 9/2011 | Xu et al. ................... 375/240.01 | |
| 2012/0044987 A1* | 2/2012 | Bennett .................... 375/240.02 | |

FOREIGN PATENT DOCUMENTS

| | | | |
|---|---|---|---|
| KR | 1020050085368 | 8/2005 | |
| KR | 1020080090421 | 10/2008 | |
| WO | WO 2008/153856 A1 * | 12/2008 | ............... H04N 7/26 |

OTHER PUBLICATIONS

Camilo et al: "A Direction-Adaptive In-Loop Deartifacting Filter for Video Coding", Image Processing, 2008. ICIP 2008, Oct. 12, 2008, pp. 1624-1627, XP031374329.

Sandeep Kanumuri: "Temporal Flicker Reduction and Denoising in Video Using Sparse Directional Transforms", Proceedings of the SPIE, Aug. 11, 2008, pp. 1-11, XP55010626.

Search Report Dated: Oct. 28, 2011.

\* cited by examiner

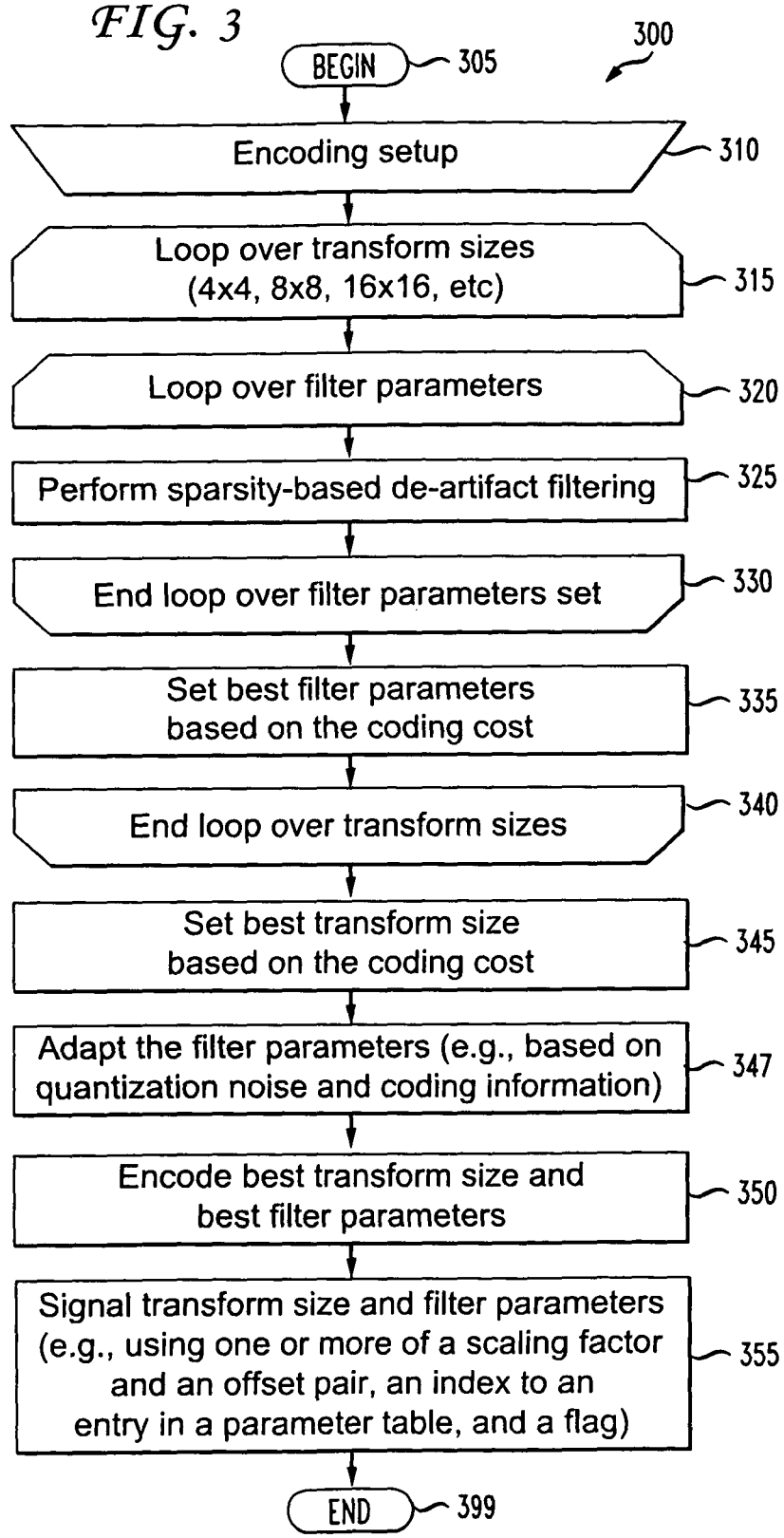

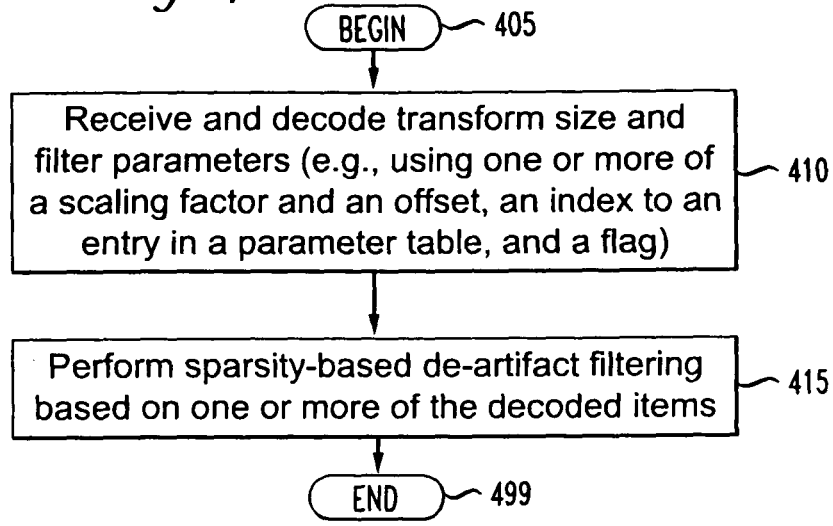
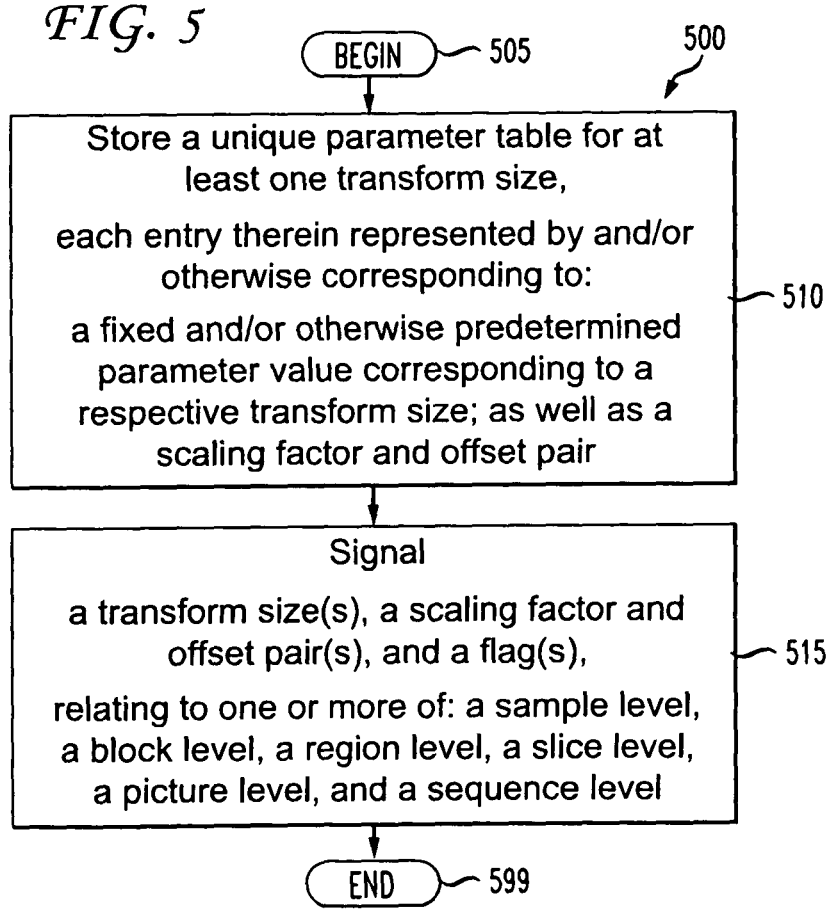

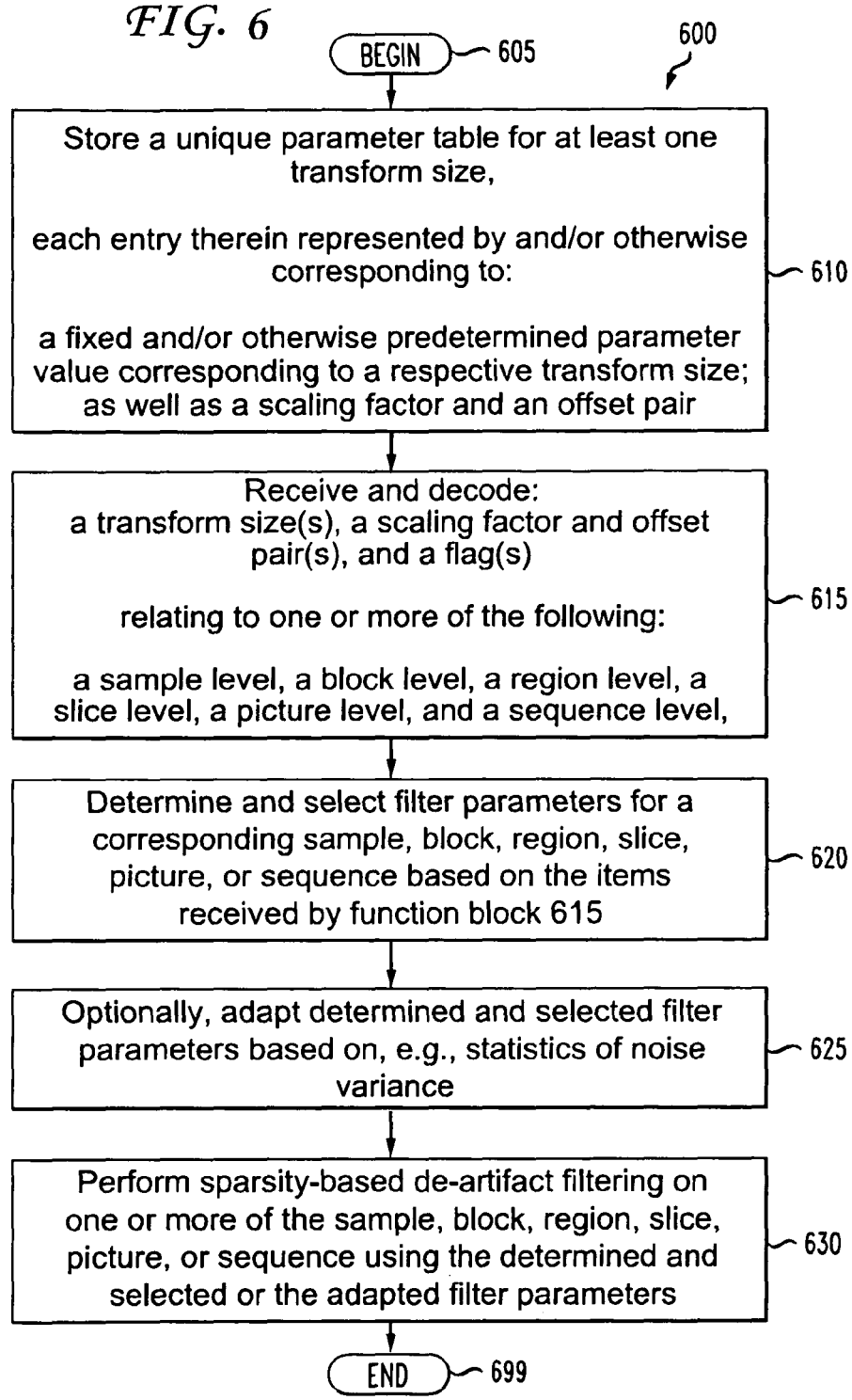

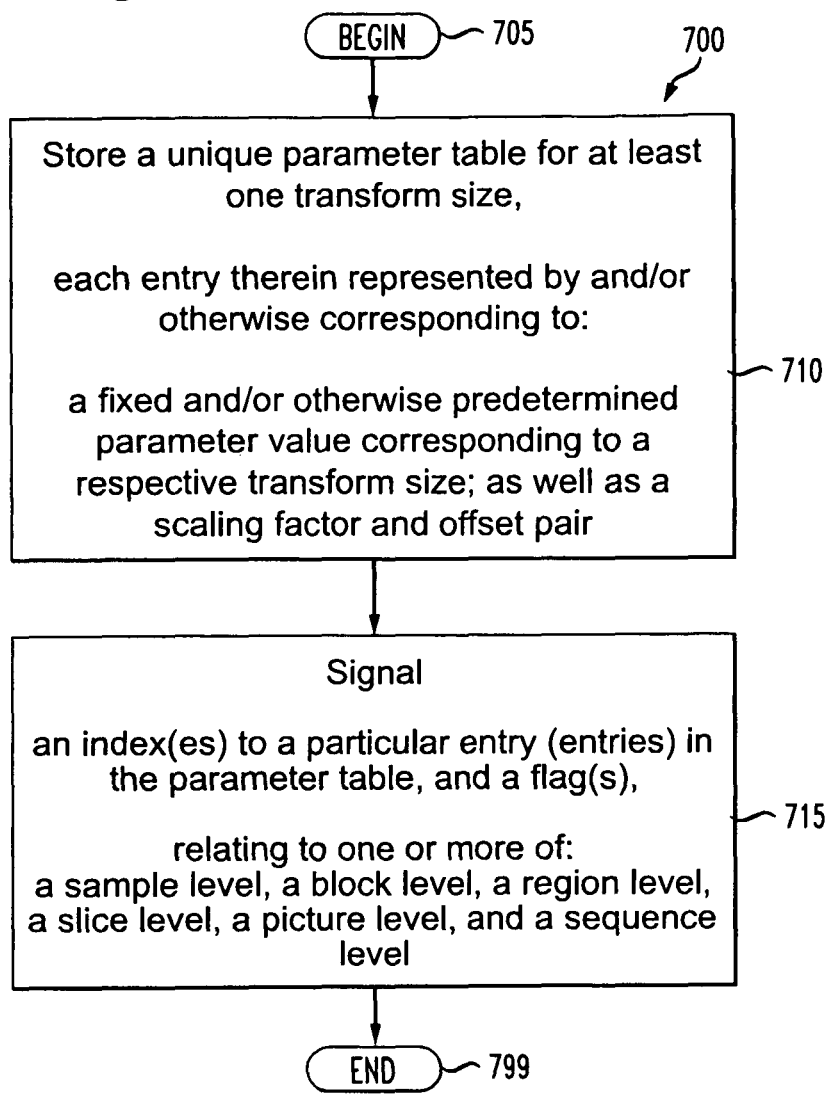

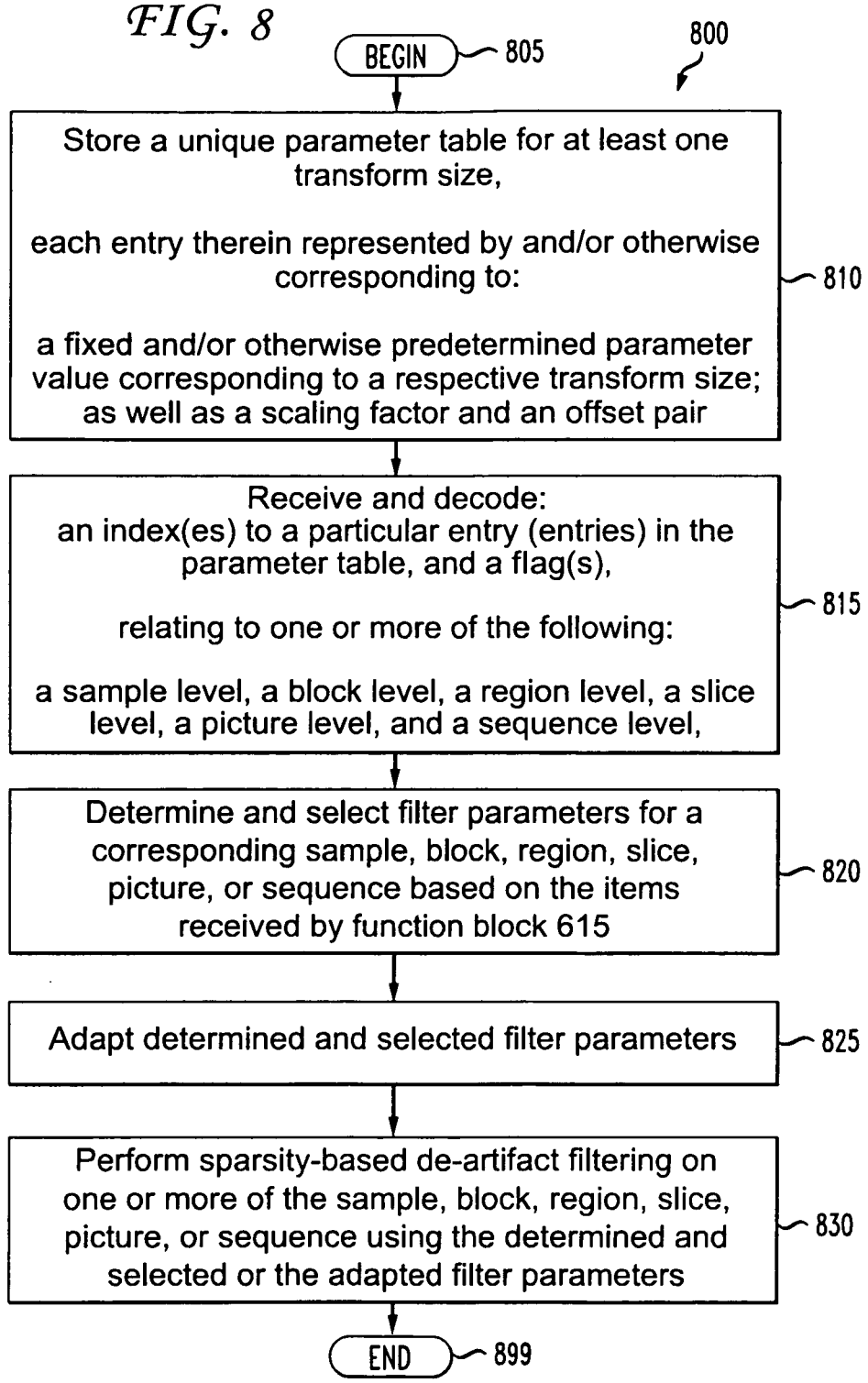

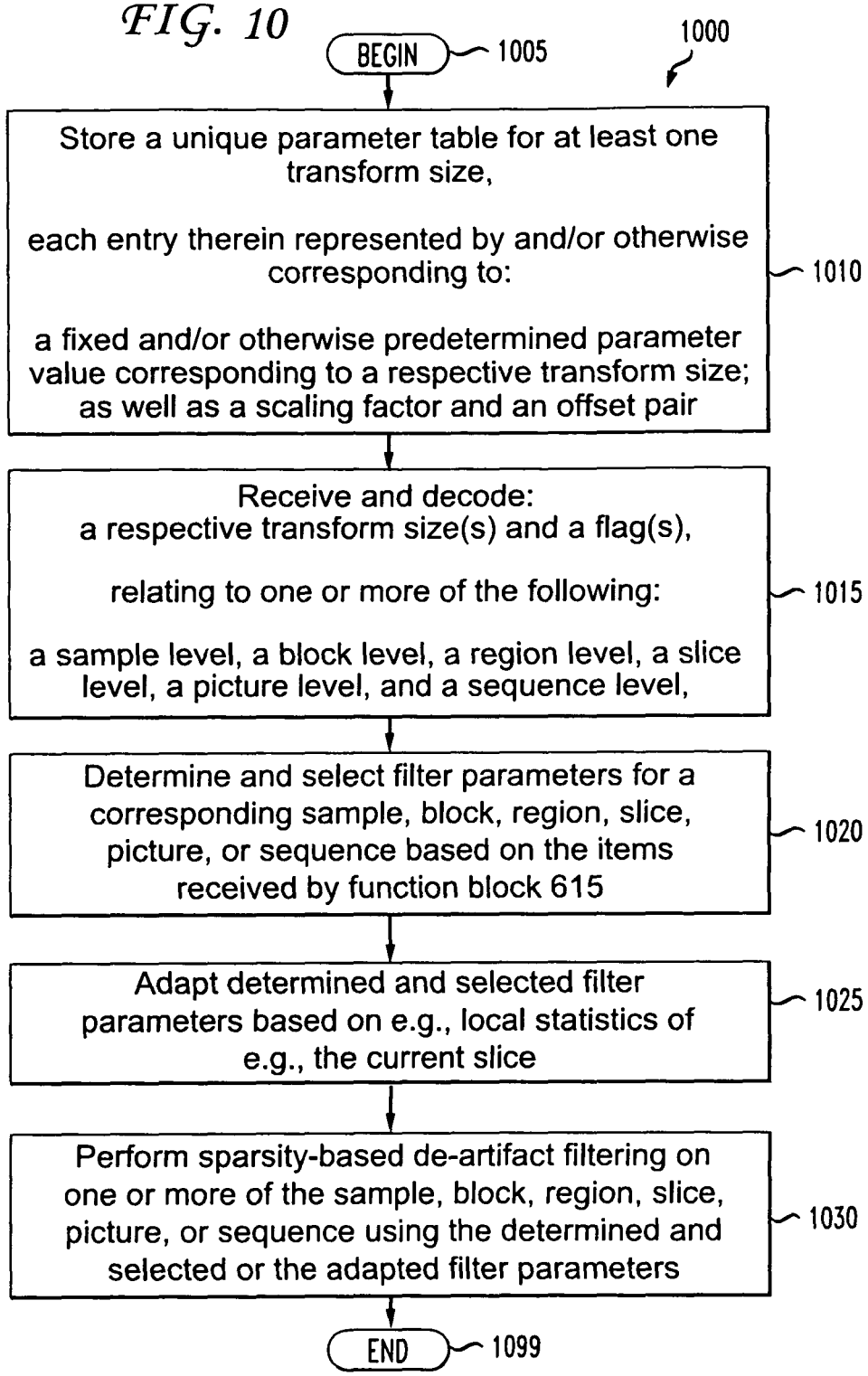

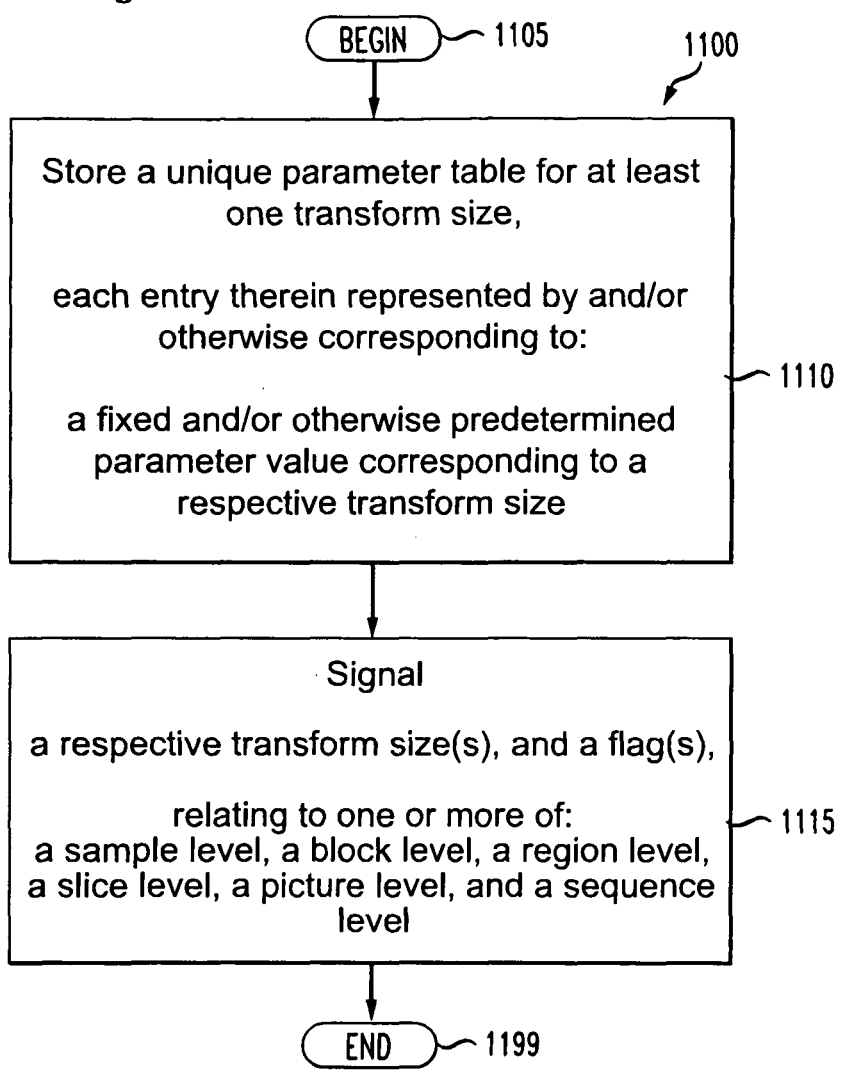

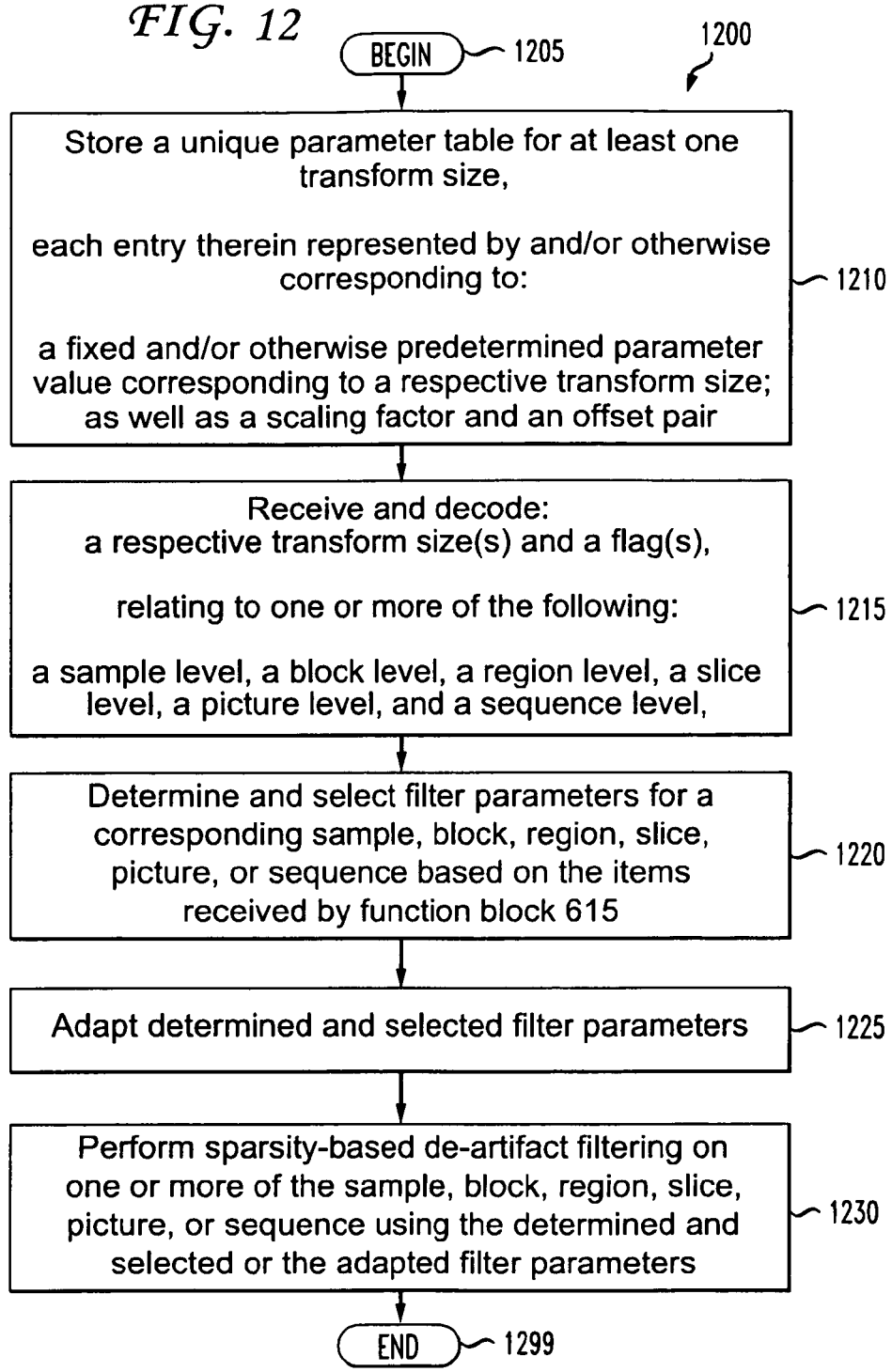

METHODS AND APPARATUS FOR FILTER PARAMETER DETERMINATION AND SELECTION RESPONSIVE TO VARIABLE TRANSFORMS IN SPARSITY-BASED DE-ARTIFACT FILTERING

CROSS-REFERENCE TO RELATED APPLICATIONS

This application claims the benefit, under 35 U.S.C. §365 of International Application PCT/US10/00915, filed Mar. 26, 2010, which was published in accordance with PCT Article 21(2) on Oct. 21, 2010 in English and which claims the benefit of U.S. provisional patent application No. 61/168,990 filed Apr. 14, 2009.

TECHNICAL FIELD

The present principles relate generally to video encoding and decoding and, more particularly, to methods and apparatus for filter parameter determination and selection responsive to variable transforms in sparsity-based de-artifact filtering.

BACKGROUND

Video coding standards employ block-based transforms (for example, the ubiquitous discrete cosine transform, or DCT) and motion compensation to achieve compression efficiency. Coarse quantization of the transform coefficients and the use of different reference locations or different reference pictures by neighboring blocks in motion-compensated prediction can give rise to visually disturbing artifacts such as distortion around edges, textures or block discontinuities. In the state-of-the-art International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"), an adaptive de-blocking filter is introduced to combat the artifacts arising along block boundaries.

More general de-artifacting approaches have been proposed to combat artifacts not only on block discontinuities but also around image singularities (e.g., edges and/or textures), wherever these may appear. In a first prior art approach, an overcomplete set of 4×4 DCT is utilized to provide sparse decompositions of the noisy reconstructed signal in relative low resolution video sources, such as quarter common intermediate format (QCIF) and common intermediate format (CIF). However, the small size DCT transform may not be efficient in the coding of high resolution video content (e.g., 720p and 1080p video content) and transforms of larger sizes or different basis are needed to scale well to the increased spatial resolution. Specifically, the filter parameters (including the threshold, the number of iterations, and so forth) are very important to the filtering performance and should be adaptive with the transform as well.

Deblocking Filter in the MPEG-4 AVC Standard

Within the state-of-the-art MPEG-4 AVC Standard, an in-loop deblocking filter has been adopted. The filter acts to attenuate artifacts arising along block boundaries. Such artifacts are caused by coarse quantization of the transform (DCT) coefficients as well as motion compensated prediction. By adaptively applying low-pass filters to the block edges, the deblocking filter can improve both subjective and objective video quality. The filter operates by performing an analysis of the samples around a block edge and adapts filtering strength to attenuate small intensity differences attributable to blocky artifacts while preserving the generally larger intensity differences pertaining to the actual image content. Several block coding modes and conditions also serve to indicate the strength with which the filters are applied. These include inter/intra prediction decisions, the presence of coded residuals and motion differences between adjacent blocks. Besides adaptability on the block-level, the deblocking filter is also adaptive at the slice-level and the sample-level. On the slice level, filtering strength can be adjusted to the individual characteristics of the video sequence. On the sample level, filtering can be turned off at each individual sample depending on sample value and quantizer-based thresholds.

The blocky artifacts removed by the MPEG-4 AVC Standard deblocking filter are not the only artifacts that are present in compressed video. Coarse quantization is also responsible for other artifacts such as, for example, ringing, edge distortion, and texture corruption. The deblocking filter cannot reduce artifacts caused by quantization errors which appear inside a block. Moreover, the low-pass filtering techniques employed in deblocking assume a smooth image model and are not suited for processing image singularities such as, for example, edges and textures.

Sparsity-Based De-Artifacting

Inspired by sparsity-based de-noising techniques, a non-linear in-loop filter has been proposed for compression de-artifacting as noted above with respect to the first prior art approach. The first prior art approach uses a set of de-noised estimates provided by an over-complete set of transforms. The implementation of the first prior art approach generates an over-complete set of transforms by using all possible translations $H_i$ of a given two dimensional (2D) orthonormal transform H, such as wavelets or DCT. Thus, given an image I, a series of different transformed versions $Y_i$ of the image I is created by applying the various transforms $H_i$. Each transformed version $Y_i$ is then subject to a de-noising procedure, typically involving a thresholding operation, producing the series of $Y'_i$. The transformed and thresholded coefficients $Y'_i$ are then inverse transformed back into the spatial domain, giving rise to the de-noised estimates $I_i$. In over-complete settings, it is expected that some of the de-noised estimates will provide better performance than others and that the final filtered version I' will benefit from a combination via averaging of such de-noised estimates. The first prior art approach de-noising filter proposes the weighted averaging of de-noised estimates $I'_i$ where the weights are optimized to emphasize the best de-noised estimates based on signal sparsity.

The set of orthonormal transforms $\{H_i\}$ is expected to provide sparse decompositions of the image I. For instance, the DCT of block size 4×4 has been used in the first prior art approach process for QCIF content. With the growing popularity of high definition (HD) content, a small block size DCT may no longer be efficient as it does not scale well to the increased resolution, especially when the encoding procedure utilizes larger transforms and quantizes the coefficients in a larger block scale. In this regard, transforms of a larger size (e.g., 8×8 or 16×16) or with different basis functions are introduced in de-noising to better exploit the spatial correlation within larger block units.

On the other hand, the choice of filter parameters, for example, such as threshold, is of great importance to the performance of the de-artifacting filter. The threshold is essential to the de-noising capacity of the filter in terms of both the accuracy of the de-noised estimates and the averaging weights that emphasize the best de-noising estimates. Inadequate threshold selection may result in over-smoothed reconstructed pictures or may allow the persistence of artifacts. In the first prior art approach, the thresholds per pixel class based on QP and coding mode information are stored at both the encoder and the decoder and they are not adaptive with the transform.

With different transform sizes or different basis functions, the noise or artifacts behavior of a video sequence under the same QP or coding mode can be very different, which calls for different filter parameters.

SUMMARY

These and other drawbacks and disadvantages of the prior art are addressed by the present principles, which are directed to methods and apparatus for filter parameter determination and selection responsive to variable transforms in sparsity-based de-artifact filtering.

According to an aspect of the present principles, there is provided an apparatus. The apparatus includes an encoder for encoding picture data for at least a portion of at least a picture. The encoder includes a sparsity-based de-artifact filter for performing sparsity-based de-artifact filtering on the portion. One or more filter parameters for the sparsity-based de-artifact filtering are determined and selected responsive to variable transforms.

According to another aspect of the present principles, there is provided a method in a video encoder. The method includes encoding picture data for at least a portion of at least a picture. The encoding step includes performing sparsity-based de-artifact filtering on the portion. One or more filter parameters for the sparsity-based de-artifact filtering are determined and selected responsive to variable transforms.

According to yet another aspect of the present principles, there is provided an apparatus. The apparatus includes a decoder for decoding picture data for at least a portion of at least a picture. The decoder includes a sparsity-based de-artifact filter for performing sparsity-based de-artifact filtering on the portion. One or more filter parameters for the sparsity-based de-artifact filtering are determined and selected responsive to variable transforms.

According to still another aspect of the present principles, there is provided a method in a video decoder. The method includes decoding picture data for at least a portion of at least a picture. The decoding step includes performing sparsity-based de-artifact filtering on the portion. One or more filter parameters for the sparsity-based de-artifact filtering are determined and selected responsive to variable transforms.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 3 is a flow diagram showing an exemplary method for filter parameter determination and selection for de-artifact filtering in a video encoder, in accordance with an embodiment of the present principles;

FIG. 4 is a flow diagram showing an exemplary method for filter parameter determination and selection for de-artifact filtering in a video decoder, in accordance with an embodiment of the present principles;

FIG. 5 is a flow diagram showing another exemplary method for filter parameter determination and selection for de-artifact filtering in a video encoder, in accordance with an embodiment of the present principles;

FIG. 6 is a flow diagram showing another exemplary method for filter parameter determination and selection for de-artifact filtering in a video decoder, in accordance with an embodiment of the present principles;

FIG. 7 is a flow diagram showing another exemplary method for filter parameter determination and selection for de-artifact filtering in a video encoder, in accordance with an embodiment of the present principles;

FIG. 8 is a flow diagram showing another exemplary method for filter parameter determination and selection for de-artifact filtering in a video decoder, in accordance with an embodiment of the present principles;

FIG. 10 is a flow diagram showing another exemplary method for filter parameter determination and selection for de-artifact filtering in a video decoder, in accordance with an embodiment of the present principles;

FIG. 11 is a flow diagram showing another exemplary method for filter parameter determination and selection for de-artifact filtering in a video encoder, in accordance with an embodiment of the present principles; and FIG. 12 is a flow diagram showing another exemplary method for filter parameter determination and selection for de-artifact filtering in a video decoder, in accordance with an embodiment of the present principles.

DETAILED DESCRIPTION

Figure 1:
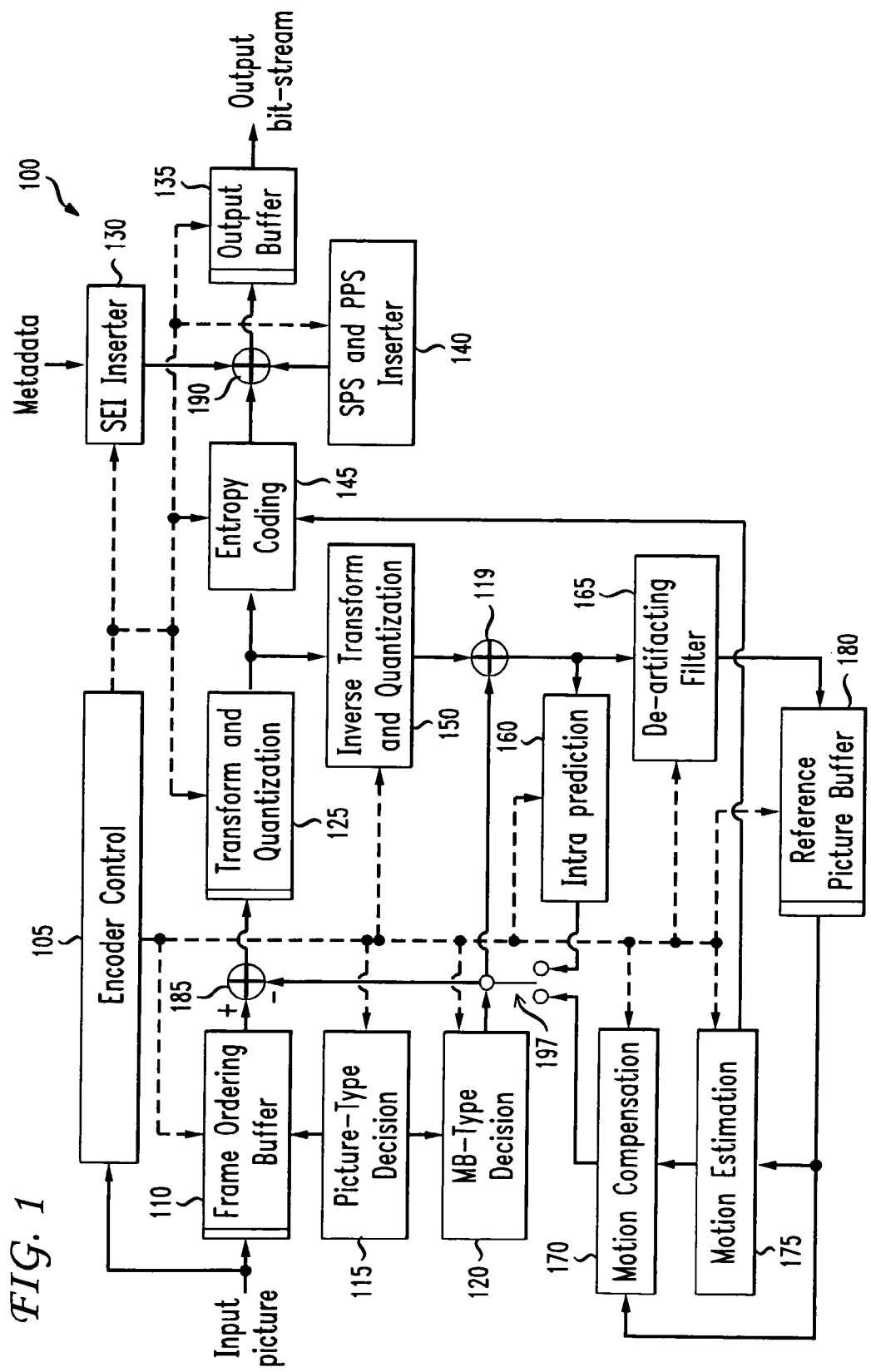
FIG. 1 is a block diagram showing an exemplary video encoder to which the present principles may be applied, in accordance with an embodiment of the present principles.

The present principles are directed to methods and apparatus for filter parameter determination and selection responsive to variable transforms in sparsity-based de-artifact filtering.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Further, it is to be appreciated that while one or more embodiments of the present principles are described herein with respect to a thresholding parameter, the present principles are not limited to only threshold parameters with respect to filter parameters to which the present principles may be applied and, thus, may be applied to any other filter parameters as readily determined by one of skill in this and related arts, while maintaining the spirit of the present principles.

Also, as used herein, the words "picture" and "image" are used interchangeably and refer to a still image or a picture from a video sequence. As is known, a picture may be a frame or a field.

Additionally, as used herein, the word "signal" refers to, among other things, indicating something to a corresponding decoder. For example, the encoder may signal a particular transform size(s) and/or filter parameter(s) from among group of possible transform sizes and/or filter parameters in order to make the decoder aware of which particular transform size(s) and/or filter parameter(s) was used on the encoder side. In this way, the same transform size(s) and/or filter parameter(s) may be used at both the encoder side and the decoder side. Thus, for example, an encoder may transmit a particular transform size(s) and/or filter parameter(s) to the decoder so that the decoder may use the same particular transform size(s) and/or filter parameter(s) or, if the decoder already has the particular transform size(s) and/or filter parameter(s) as well as others, then signaling may be used (without transmitting) to simply allow the decoder to know and select the particular transform size(s) and/or filter parameter(s). By avoiding transmission of any actual transform sizes and/or filter parameters, a bit savings may be realized. It is to be appreciated that signaling may be accomplished in a variety of ways. For example, one or more syntax elements, flags, and so forth may be used to signal information to a corresponding decoder. While the preceding relates to the verb form of the word "signal", the word "signal" may also be used herein as a noun.

Further, as used herein, the phrase "picture region" (or simply "region" for short') refers to a portion of a picture encompassing and/or otherwise formulated from, for example, one or more blocks or arbitrary shapes of any size. The one or more blocks may relate to, for example, a super macroblock, a macroblock, a macroblock partition, a sub-macroblock partition, and so forth. Moreover, contrary to a conventional de-blocking filter which is limited to block boundaries, a picture region in accordance with the present principles is capable of involving a non-block-boundary as well as block boundaries. That is, in some embodiments, a picture region may involve only a non-block-boundary (i.e., to the exclusion of any block boundaries). Thus, regions other than block boundaries may advantageously be filtered to remove or reduce artifacts there from.

Turning to FIG. 1, a video encoder capable of performing video encoding in accordance with the present principles is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a de-artifacting filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the de-artifacting filter 165. An output of the de-artifacting filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
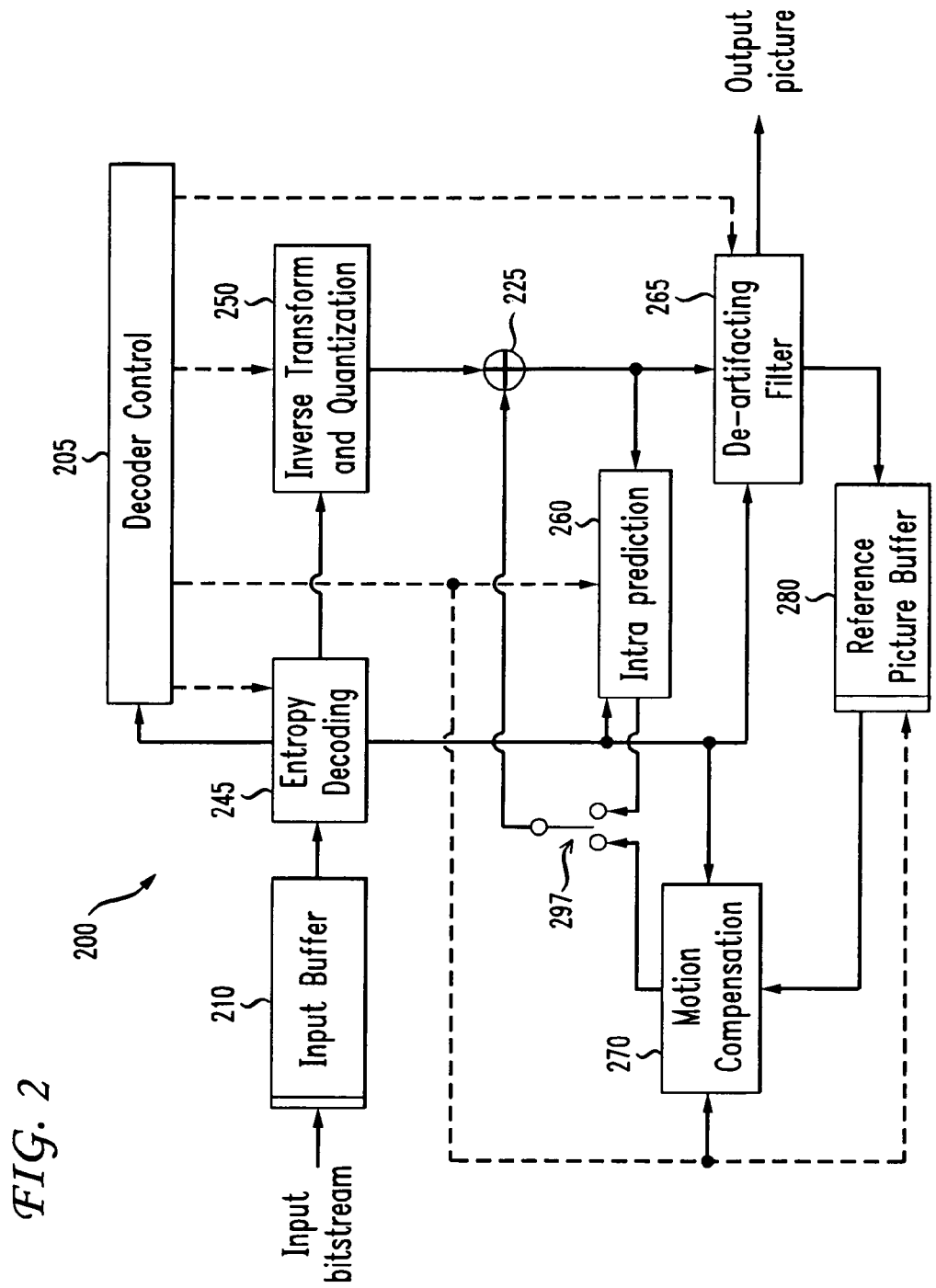
FIG. 2 is a block diagram showing an exemplary video decoder to which the present principles may be applied, in accordance with an embodiment of the present principles.

Turning to FIG. 2, a video decoder capable of performing video decoding in accordance with the present principles is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a de-artifacting filter 265 and a first input of an intra prediction module 260. A second output of the de-artifacting filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the de-artifacting filter 265, and a third input of the intra predictor 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the de-artifacting filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the de-artifacting filter 265 is available as an output of the decoder 200, for outputting an output picture.

As noted above, the present principles are directed to methods and apparatus for filter parameter determination and selection responsive to variable transforms in sparsity-based de-artifact filtering.

In accordance with the present principles, we propose methods and apparatus directed to adapting, adjusting, setting, and/or otherwise selecting and configuring the filter parameters, based on variable transform de-artifact filtering. Advantageously, since filter parameter adaptation is capable of significantly impacting sparsity-based de-artifact filtering, the ability to configure filter parameters for variable transform de-artifact filtering associated with the present principles can improve coding efficiency.

In an embodiment, we focus on the transform with the same orientation of the basis but having a different transform size. We adapt the filter parameters not only based on QP and mode information, but also based on the transform size. Although described with respect to examples applied to the MPEG-4 AVC Standard and also to a thresholding parameter for illustrative purposes, it is to be appreciated as noted above that the present principles may be applied to other video coding standards and recommendations and extensions thereof as well as other filter parameters, while maintaining the spirit of the present principles. Moreover, it is to be appreciated that other embodiments may involve one or more transforms with different orientations.

In one embodiment, the transform can be one or more of DCT, wavelets, and so forth, the transform size can be one or more of 4×4, 8×8, 16×16, 32×32, and so forth, and the transform dimension can be one, two, or more. Of course, the present principles are not limited to the preceding transform types, transform sizes, or transform dimensions and, thus, may be applied to other transform types, transform sizes, and transform dimensions, while maintaining the spirit of the present principles. For each transform size, the parameters of the de-artifacting filter can be different. Both the transform size selected and its corresponding filter parameters need to be signaled, for example, using a high level syntax located within, but not limited to, the slice header for each slice, a picture parameter set (PPS), a sequence parameter set (SPS), a network abstraction layer (NAL) unit header, and so forth. To save the signaling overhead, several methods can be applied. Some exemplary methods for saving the signaling overhead are provided herein for illustrative purposes.

Thus, it is to the noted that while many of the embodiments described herein are directed to transform size as a particular transform parameter used in accordance with the present principles, other transform parameters may also be used in accordance with the teachings of the present principles, while maintaining the spirit of the present principles. Moreover, some embodiments may involve variability of one particular transform a parameter (e.g., size) while other embodiments may involve variability with respect to more than one particular transform parameter. These and other variations of the present principles are readily determined by one of ordinary skill in this and related arts given the teachings of the present principles provided herein, while maintaining the spirit of the present principles.

Turning to FIG. 3, an exemplary method for filter parameter determination and selection for de-artifact filtering in a video encoder is indicated generally by the reference numeral 300. The method 300 includes a start block 305 that passes control to a function block 310. The function block 310 performs an encoding setup, and passes control to a loop limit block 315. The loop limit block 315 begins a loop over each transform size (e.g., 4×4, 8×8, 16×16, and so forth), and passes control to a loop limit block 320. The loop limit block 320 begins a loop over filter parameters, and passes control to a function block 325. The function block 325 performs de-artifact filtering, and passes control to a loop limit block 330. The loop limit block 330 ends the loop over the filter parameters, and passes control to a function block 335. The function block 335 sets (e.g., determines and selects) the best filter parameters based on the coding cost, and passes control to a loop limit block 340. The loop limit block 340 ends the loop over the transform sizes, and passes control to a function block 345. The function block 345 sets (e.g., determines and selects) the best transform size based on the coding cost, and passes control to a function block 347. The function block 347 adapts the filter parameters (e.g., based on quantization noise and coding information), and passes control to a function block 350. The function block 350 encodes the best transform size and best filter parameters, and passes control to a function block 355. The function block 355 signals the transform size and filter parameters (e.g., using one or more of a scaling factor and an offset pair, an index to an entry in a parameter table, and a flag (e.g., the flag indicating whether a variable transform is applied), and passes control to an end block 399. It is to be appreciated that the signaling performed by function block 355 may relate to, for example, one or more samples, one or more blocks, one or more slices, one or more pictures, and so forth. Moreover, it is to be appreciated that function block 355 may be optional, depending upon the particular implementation.

Turning to FIG. 4, an exemplary method for filter parameter determination and selection for de-artifact filtering in a video decoder is indicated generally by the reference numeral 400. The method 400 includes a start block 405 that passes control to a function block 410. The function block 410 decodes a transform size and filter parameters (e.g., using one or more of a scaling factor and offset pair, an index to an entry in a parameter table, and a flag), and passes control to a function block 415. The function block 415 performs sparsity-based de-artifact filtering based on one or more of items decoded by function block 410, and passes control to an end block 499.

In one embodiment, a unique parameter table $P_0$ for one transform size $S_0$ that can be formed based on QP value and coding mode information is stored at both the encoder and decoder. The parameter table $P_i$ of other transform sizes such as, for example, $S_i$, can be a function of $P_0$ and $S_i$, i.e., $P_i=f(P_0, S_i)$.

In an embodiment, we can set $P_i=a_i*P_0+b_i$ for each entry of the table where $a_i$ and $b_i$ can be constants. Thus, for transform block size $S_i$, we only need to signal the scaling factor $a_i$ and the offset $b_i$.

Turning to FIG. 5, another exemplary method for filter parameter determination and selection for de-artifact filtering in a video encoder is indicated generally by the reference numeral 500. The method 500 includes a start block 505 that passes control to a function block 510. The function block 510 stores a unique parameter table for each transform size, and passes control to a function block 515. In an embodiment, each entry in the parameter table is represented by and/or other corresponds to a fixed and/or otherwise predetermined parameter value corresponding to a respective transform size, as well as a scaling factor and an offset pair. In an embodiment, the filter parameters are determined using, for example, method 300. The function block 515 signals a respective transform size(s), a scaling factor and offset pair(s), and a flag(s), relating to one or more of a sample level, a block level, a region level, a slice level, a picture level, and a sequence level (in the case that the picture is part of a video sequence), and passes control to an end block 599.

Turning to FIG. 6, another exemplary method for filter parameter determination and selection for de-artifact filtering in a video decoder is indicated generally by the reference numeral 600.

The method 600 includes a start block 605 that passes control to a function block 610. The function block 610 stores a unique parameter table for at least one transform size, and passes control to a function block 615. In an embodiment, each entry in the parameter table is represented by and/or other corresponds to a fixed and/or otherwise predetermined parameter value corresponding to a respective transform size, a scaling factor, and an offset. The function block 615 receives and decodes a respective transform size(s), a scaling factor and offset pair(s), and a flag(s), relating to one or more of a sample level, a block level, a region level, a slice level, a picture level, and a sequence level (in the case that the picture is part of a video sequence), and passes control to a function block 620. The function block 620 determines and selects filter parameters for a corresponding sample, block, region, slice, picture, or sequence, based on items received by function block 615, and passes control to a function block 625. The function block 625 optionally adapts the determined and selected filter parameters based on, e.g., statistics of noise variance, and passes control to a function block 630. The function block 630 performs sparsity-based de-artifact filtering on the sample, block, region, slice, picture, or sequence using the determined and selected or the adapted filter parameters, and passes control to an end block 699.

In an embodiment, we can set $P_i = a_i * P_0 + b_i$ for each entry of the table where $a_i$ and $b_i$ can be constants. Thus, for transform block size $S_i$, we only need to signal a corresponding index to the parameter table.

Turning to FIG. 7, another exemplary method for filter parameter determination and selection for de-artifact filtering in a video encoder is indicated generally by the reference numeral 700. The method 700 includes a start block 705 that passes control to a function block 710. The function block 710 stores a unique parameter table for at least one transform size, and passes control to a function block 715. In an embodiment, each entry in the parameter table is represented by and/or other corresponds to a fixed and/or otherwise predetermined parameter value corresponding to a respective transform size, as well as a scaling factor and an offset pair. In an embodiment, the filter parameters are determined using, for example, method 300. The function block 715 signals an index(es) to a particular entry in the parameter table, and a flag(s), relating to one or more of a sample level, a block level, a region level, a slice level, a picture level, and a sequence level (in the case that the picture is part of a video sequence a respective transform size(s), and passes control to an end block 799.

Turning to FIG. 8, another exemplary method for filter parameter determination and selection for de-artifact filtering in a video decoder is indicated generally by the reference numeral 800.

The method 800 includes a start block 805 that passes control to a function block 810. The function block 810 stores a unique parameter table for at least one transform size, and passes control to a function block 815. In an embodiment, each entry in the parameter table is represented by and/or other corresponds to a fixed and/or otherwise predetermined parameter value corresponding to a respective transform size, a scaling factor, and an offset. The function block 815 receives and decodes a respective transform size(s), an index(es) to a particular entry in the parameter table, and a flag(s), relating to one or more of a sample level, a block level, a region level, a slice level, a picture level, and a sequence level (in the case that the picture is part of a video sequence), and passes control to a function block 820. The function block 820 determines and selects filter parameters for a corresponding sample, block, region, slice, picture, or sequence, based on items received by function block 815, and passes control to a function block 825. The function block 825 adapts the determined and selected filter parameters, and passes control to a function block 830. The function block 830 performs sparsity-based de-artifact filtering on the sample, block, region, slice, picture, or sequence using the determined and selected filter parameters, and passes control to an end block 899.

Alternatively, the parameters $a_i$ and $b_i$ can be adaptive based on the statistics of the current slice. In an embodiment, the statistics can be local variance before the de-artifacting filter in which case $a_i$ and $b_i$ do not need to be signaled.

Figure 9:
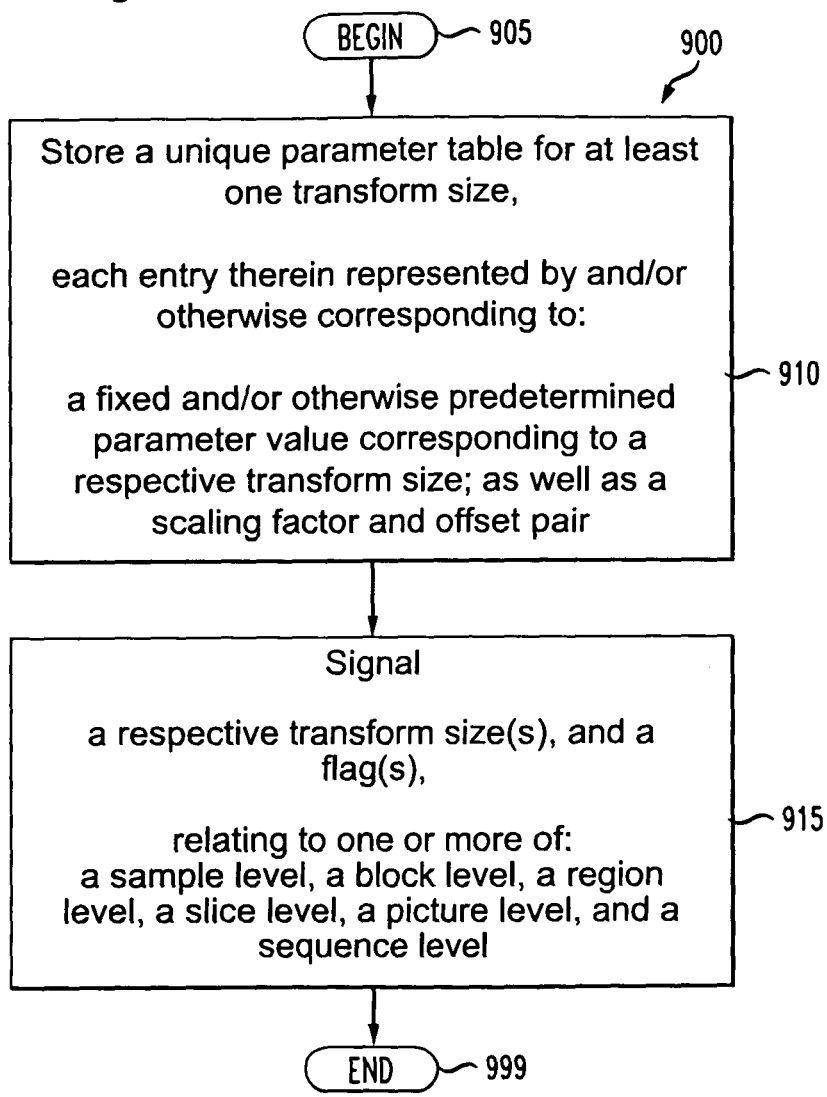
FIG. 9 is a flow diagram showing another exemplary method for filter parameter determination and selection for de-artifact filtering in a video encoder, in accordance with an embodiment of the present principles.

Turning to FIG. 9, another exemplary method for filter parameter determination and selection for de-artifact filtering in a video encoder is indicated generally by the reference numeral 900. The method 900 includes a start block 905 that passes control to a function block 910. The function block 910 stores a unique parameter table for at least one transform size, and passes control to a function block 915. In an embodiment, each entry in the parameter table is represented by and/or other corresponds to a fixed and/or otherwise predetermined parameter value corresponding to a respective transform size, as well as a scaling factor and an offset pair. In an embodiment, the filter parameters are determined using, for example, method 300. The function block 915 signals a respective transform size(s) and a flag(s), relating to one or more of a sample level, a block level, a region level, a slice level, a picture level, and a sequence level (in the case that the picture is part of a video sequence), and passes control to an end block 999.

Turning to FIG. 10, another exemplary method for filter parameter determination and selection for de-artifact filtering in a video decoder is indicated generally by the reference numeral 1000.

The method 1000 includes a start block 1005 that passes control to a function block 1010. The function block 1010 stores a unique parameter table for at least one transform size, and passes control to a function block 1015. In an embodiment, each entry in the parameter table is represented by and/or other corresponds to a fixed and/or otherwise predetermined parameter value corresponding to a respective transform size, a scaling factor, and an offset. The function block 1015 receives and decodes a respective transform size(s) and a flag(s), relating to one or more of a sample level, a block level, a region level, a slice level, a picture level, and a sequence level (in the case that the picture is part of a video sequence), and passes control to a function block 1020. The function block 1020 determines and selects filter parameters for a corresponding sample, block, region, slice, picture, or sequence, based on items received by function block 1015, and passes control to a function block 1025. The function block 1025 adapts the determined and selected filter parameters based on, e.g., local statistics of, e.g., the current slice, and passes control to a function block 1030. The function block 1030 performs sparsity-based de-artifact filtering on the sample, block, region, slice, picture, or sequence using the determined and selected filter parameters, and passes control to an end block 1099.

In another embodiment, the statistics can be of the variance of noise in which case $a_i$ and $b_i$ should be signaled. In such a case, function block 1025 may adapt the determined and selected filter parameters based on, e.g., statistics of noise variance, as optionally shown with respect to function block 1025.

In another embodiment, a set of parameters for each transform size is stored at both the encoder and decoder. For each slice, we just need to signal the transform size. Hence, it is to be noted that FIGS. 9 and 10 differ from FIGS. 10 and 11 in that the parameter table does not use scaling factor and offset pairs.

Turning to FIG. 11, another exemplary method for filter parameter determination and selection for de-artifact filtering in a video encoder is indicated generally by the reference numeral 1100. The method 1100 includes a start block 1105 that passes control to a function block 1110. The function block 1110 stores a unique parameter table for at least one transform size, and passes control to a function block 1115. In an embodiment, each entry in the parameter table is represented by and/or other corresponds to a fixed and/or otherwise predetermined parameter value corresponding to a respective transform size. In an embodiment, the filter parameters are determined using, for example, method 300. The function block 1115 signals a respective transform size(s) and a flag(s), relating to one or more of a sample level, a block level, a region level, a slice level, a picture level, and a sequence level (in the case that the picture is part of a video sequence), and passes control to an end block 1199.

Turning to FIG. 12, another exemplary method for filter parameter determination and selection for de-artifact filtering in a video decoder is indicated generally by the reference numeral 1200.

The method 1200 includes a start block 1205 that passes control to a function block 1210. The function block 1210 stores a unique parameter table for at least one transform size, and passes control to a function block 1215. In an embodiment, each entry in the parameter table is represented by and/or other corresponds to a fixed and/or otherwise predetermined parameter value corresponding to a respective transform size, a scaling factor, and an offset. The function block 1215 receives and decodes a respective transform size(s) and a flag(s), relating to one or more of a sample level, a block level, a region level, a slice level, a picture level, and a sequence level (in the case that the picture is part of a video sequence), and passes control to a function block 1220. The function block 1220 determines and selects filter parameters for a corresponding sample, block, region, slice, picture, or sequence, based on items received by function block 1215, and passes control to a function block 1225. The function block 1225 adapts the determined and selected filter parameters, and passes control to a function block 1230. The function block 1230 performs sparsity-based de-artifact filtering on the sample, block, region, slice, picture, or sequence using the determined and selected filter parameters, and passes control to an end block 1299.

In one or more embodiments, a flag can be used to indicate whether a variable transform size is applied for the current picture/slice.

It is to be appreciated that the above methods can be applied to luminance and/or chrominance.

TABLE 1 shows exemplary picture and slice header syntax, in accordance with an embodiment of the present principles.

TABLE 1

| picture_header( ) { | Descriptor |
|---|---|
|     transform_size_adaptive_flag | u(1) |
| } | |
| slice_header( ) { | |
|     if(transform_size_adaptive_flag==1) { | |
|         transform_size_idx | u(2) |
|         for(j=0; j<num_of_classes;j++) { | |
|             parameter_idx [j] | u(2) |
|         } | |
|     } | |
|     .... | |
| } | |

The semantics for at least some of the syntax elements of TABLE 1 are as follows:

transform_size_adaptive_flag equal to 1 specifies whether a variable transform size is used for the picture. transform_size_adaptive_flag equal to 0 indicates a variable transform size is not used for the picture.

transform_size_idx specifies the transform block size of the current slice.

parameter_idx [j] specifies the parameter index for the current transform size and class j.

A description will now be given of some of the many attendant advantages/features of the present invention, some of which have been mentioned above. For example, one advantage/feature is an apparatus having an encoder for encoding picture data for at least a portion of at least a picture. The encoder includes a sparsity-based de-artifact filter for performing sparsity-based de-artifact filtering on the portion. One or more filter parameters for the sparsity-based de-artifact filtering are determined and selected responsive to variable transforms.

Another advantage/feature is the apparatus having the encoder that includes the sparsity-based filter as described above, wherein the picture is part of a video sequence, and the one or more filter parameters relate to at least one of a sample level, a block level, a region level, a slice level, a picture level, and a sequence level.

Yet another advantage/feature is the apparatus having the encoder that includes the sparsity-based filter as described above, wherein the one or more filter parameters are determined and selected by performing a filter parameter determination and selection process. The filter parameter determination and selection process is combined with a filter parameter adaptation process. The filter parameter adaptation process is based on at least quantization noise and coding information.

Still another advantage/feature is the apparatus having the encoder that includes the sparsity-based filter as described above, wherein transform sizes and at least some of the one or more filter parameters for the sparsity-based de-artifact filtering are signaled using one or more high level syntax elements.

A further advantage/feature is the apparatus having the encoder that includes the sparsity-based filter as described above, wherein the variable transforms are variable with respect to at least one of transform type, transform size, transform dimension, and transform orientation.

Moreover, another advantage/feature is the apparatus having the encoder that includes the sparsity-based filter wherein the variable transforms are variable with respect to at least one of transform type, transform size, transform dimension, and transform orientation as described above, wherein a filter parameter table is stored, and a corresponding filter parameter for each of the variable transforms is a function of the parameter table and a respective one of the variable transforms.

Further, another advantage/feature is the apparatus having the encoder that includes the sparsity-based filter wherein the variable transforms are variable with respect to at least one of transform type, transform size, transform dimension, and transform orientation as described above, wherein a corresponding filter parameter for each of the variable transforms is signaled by at least one of a scaling factor and an offset.

Also, another advantage/feature is the apparatus having the encoder that includes the sparsity-based filter wherein the variable transforms are variable with respect to at least one of transform type, transform size, transform dimension, and transform orientation as described above, wherein the corresponding filter parameter for each of the variable transforms is adapted prior to being signaled.

Additionally, another advantage/feature is the apparatus having the encoder that includes the sparsity-based filter wherein the variable transforms are variable with respect to at least one of transform type, transform size, transform dimension, and transform orientation as described above, wherein a corresponding filter parameter for each of the variable transforms is adapted, with or without signaling to a decoder, based on statistics of at least one of the region, a slice including the region, a picture including the region, and a video sequence including the region.

Moreover, another advantage/feature is the apparatus having the encoder that includes the sparsity-based filter wherein the variable transforms are variable with respect to at least one of transform type, transform size, transform dimension, and transform orientation as described above, wherein a set of filter parameters for each of the variable transforms is stored at both the encoder and a decoder, and only an index of corresponding one of the variable transforms is signaled to the decoder or derived at the decoder.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding picture data for at least a portion of a picture,
wherein said encoder includes a sparsity-based de-artifact filter for performing sparsity-based de-artifact filtering on the portion, and
wherein one or more filter parameters for the sparsity-based de-artifact filtering are determined and selected responsive to at least one variable feature of variable transforms, the at least one variable feature of the variable transforms comprising transform dimension; and
wherein a transform size is determined based on coding cost; and
filter parameters are adapted based on quantization noise and coding information.

2. A method for encoding picture data, comprising:
selecting filter parameters for sparsity based de-artifact filtering responsive to at least one variable feature of variable transforms, the at least one variable feature of the variable transforms comprising transform dimension;
determining a transform size based on coding cost;
adapting said filter parameters based on quantization noise and coding information; and
performing sparsity based de-artifact filtering on at least a portion of a picture.

3. The method of claim 2, wherein the picture is part of a video sequence, and the one or more filter parameters relate to at least one of a sample level, a block level, a region level, a slice level, a picture level, and a sequence level.

4. The method of claim 2, wherein the one or more filter parameters are determined and selected by performing a filter parameter determination and selection process, and wherein the filter parameter determination and selection process is combined with a filter parameter adaptation process, the filter parameter adaptation process based on at least quantization noise and coding information.

5. The method of claim 2, wherein transform sizes and at least some of the one or more filter parameters for the sparsity-based de-artifact filtering are signaled using one or more high level syntax elements.

6. The method of claim 2, wherein a filter parameter table is stored, and a corresponding non-weight filter parameter for each of the variable transforms is a function of the parameter table and a respective one of the variable transforms.

7. The method of claim 2, wherein a corresponding filter parameter for each of the variable transforms is signaled by at least one of a scaling factor and an offset.

8. The method of claim 7, wherein the corresponding filter parameter for each of the variable transforms is adapted prior to being signaled.

9. The method of claim 2, wherein a corresponding filter parameter for each of the variable transforms is adapted, with or without signaling to a decoder, based on statistics of at least one of the region, a slice including the region, a picture including the region, and a video sequence including the region.

10. The method of claim 2, wherein a set of filter parameters for each of the variable transforms is stored at both the encoder and a decoder, and only an index of a corresponding one of the variable transforms is signaled to the decoder or derived at the decoder.

11. An apparatus, comprising:
a decoder for decoding picture data for at least a portion of a picture,
wherein said decoder includes a sparsity-based de-artifact filter for performing sparsity-based de-artifact filtering on the portion, and
wherein one or more filter parameters for the sparsity-based de-artifact filtering are determined and selected responsive to at least one variable feature of variable transforms, the at least one variable feature of the variable transforms comprising transform dimension; and
wherein a transform size is determined based on coding cost; and filter parameters are adapted based on quantization noise and coding information.

12. The apparatus of claim 11, wherein the picture is part of a video sequence, and the one or more filter parameters relate to at least one of a sample level, a block level, region level, a slice level, a picture level, and a sequence level.

13. A method for decoding picture data, comprising:
selecting filter parameters for sparsity based de-artifact filtering responsive to at least one variable feature of variable transforms, the at least one variable feature of the variable transforms comprising transform dimension;
determining a transform size based on coding cost;
adapting said filter parameters based on quantization noise and coding information; and
performing sparsity based de-artifact filtering on at least a portion of a picture.

14. The method of claim 13, wherein the picture is part of a video sequence, and the one or more filter parameters relate to at least one of a sample level, a block level, a region level, a slice level, a picture level, and a sequence level.

15. The method of claim 13, wherein the one or more filter parameters are determined and selected by performing a filter parameter determination and selection process, and wherein the filter parameter determination and selection process is combined with a filter parameter adaptation process, the filter parameter adaptation process based on at least quantization noise and coding information.

16. The method of claim 13, wherein transform sizes and at least some of the one or more filter parameters for the sparsity-based de-artifact filtering are determined using one or more high level syntax elements.

17. The method of claim 13, wherein a filter parameter table is stored, and a corresponding non-weight filter parameter for each of the variable transforms is a function of the parameter table and a respective one of the variable transforms.

18. The method of claim 13, wherein a corresponding filter parameter for each of the variable transforms is determined using at least one of a scaling factor and an offset.

19. The method of claim 18, wherein the corresponding filter parameter for each of the variable transforms is adapted subsequent to being initially determined.

20. The method of claim 13, wherein a corresponding filter parameter for each of the variable transforms is adapted based on statistics of at least one of the region, a slice including the region, a picture including the region, and a video sequence including the region.

21. The method of claim 13, wherein a set of filter parameters for each of the variable transforms is stored at both the decoder and an encoder, and only an index of corresponding one of the variable transforms is received by the decoder or derived at the decoder.

22. A non-transitory computer readable storage media having video signal data encoded thereupon, comprising:
picture data encoded for at least a portion of a picture,
wherein the picture data represents the portion subsequent to sparsity-based de-artifact filtering on the portion, and
wherein one or more filter parameters for the sparsity-based de-artifact filtering are determined and selected responsive to at least one variable feature of variable transforms, the at least one variable feature of the variable transforms comprising transform dimension; and
wherein a transform size is determined based on coding cost; and
filter parameters are adapted based on quantization noise and coding information.

23. The apparatus of claim 1, wherein the picture is part of a video sequence, and the one or more filter parameters relate to at least one of a sample level, a block level, a region level, a slice level, a picture level, and a sequence level.

* * * * *